US012015222B2

(12) United States Patent
Wang

(10) Patent No.: US 12,015,222 B2
(45) Date of Patent: Jun. 18, 2024

(54) ELECTRICAL CONNECTOR WITH ADJUSTABLE WIRE INLET HOLE

(71) Applicant: EmCom Technology Inc., Taipei (TW)

(72) Inventor: Chu-Li Wang, Taipei (TW)

(73) Assignee: EMCOM TECHNOLOGY INC., Taipei (TW)

( * ) Notice: Subject to any disclaimer, the term of this patent is extended or adjusted under 35 U.S.C. 154(b) by 47 days.

(21) Appl. No.: 17/387,751

(22) Filed: Jul. 28, 2021

(65) Prior Publication Data

US 2022/0140517 A1 May 5, 2022

(30) Foreign Application Priority Data

Oct. 30, 2020 (TW) ................................ 109137968

(51) Int. Cl.
*H01R 13/453* (2006.01)
*H01R 13/422* (2006.01)

(52) U.S. Cl.
CPC ..... *H01R 13/4532* (2013.01); *H01R 13/4223* (2013.01)

(58) Field of Classification Search
CPC ............ H01R 13/4223; H01R 13/4532; H01R 13/58; H01R 13/5829; H01R 13/5837; H01R 13/582; H01R 13/5812
USPC ................................ 439/465, 466, 467, 446
See application file for complete search history.

(56) References Cited

U.S. PATENT DOCUMENTS 5,217,389 A * 6/1993 MacKay .............. H01R 13/595 439/459
5,445,538 A * 8/1995 Rodrigues .......... H01R 13/5812 439/465
6,077,122 A * 6/2000 Elkhatib ............ H01R 13/5837 439/417
6,663,411 B2 * 12/2003 Little ................... H01R 13/501 439/352

(Continued)

FOREIGN PATENT DOCUMENTS

CN 2632875 Y 8/2004
CN 102246360 A 11/2011

(Continued)

OTHER PUBLICATIONS

DE-102012111129-A1 with translation (Year: 2014).*

*Primary Examiner* — Marcus E Harcum
(74) *Attorney, Agent, or Firm* — MUNCY, GEISSLER, OLDS & LOWE, PC

(57) ABSTRACT

An electrical connector includes a main body, a first cover, and a second cover. The main body includes a first connection portion, a wire inlet portion, and an accommodating space between the first connection portion and the wire inlet portion. The first cover is pivotally connected to the first connection portion to be rotatable relative to the main body between a first position and a second position. When the first cover is at the first position, the accommodating space is opened for installation. When the first cover is at the second position, the first cover at least partially closes the accommodating space for protection. The second cover is connected to the first cover and separably encloses a wire inlet hole with the wire inlet portion. The second cover is movable relative to the wire inlet portion to adjust the size of the wire inlet hole.

5 Claims, 8 Drawing Sheets

(56) References Cited

U.S. PATENT DOCUMENTS

| | | | | |
|---|---|---|---|---|
| 6,902,423 | B2 * | 6/2005 | Castaldo | H01R 13/5829 439/467 |
| 7,614,903 | B1 * | 11/2009 | Huang | H01R 13/5841 439/446 |
| 7,713,081 | B2 * | 5/2010 | Chen | H01R 9/0527 439/468 |
| 8,007,307 | B2 * | 8/2011 | Wang | H01R 13/506 439/367 |
| 8,298,922 | B2 * | 10/2012 | Schumann | H01R 13/502 438/467 |
| 9,130,283 | B1 * | 9/2015 | Lin | H01R 4/2433 |
| 9,425,540 | B2 * | 8/2016 | Schnurpfeil | H01R 13/5825 |
| 10,033,118 | B2 * | 7/2018 | Jager | H01R 24/64 |
| 10,103,498 | B2 * | 10/2018 | Maesoba | H01R 13/65912 |
| 10,224,675 | B2 * | 3/2019 | Lin | H01R 24/64 |
| 10,381,769 | B2 * | 8/2019 | Guitard | H01R 4/2416 |
| 10,411,428 | B2 * | 9/2019 | Wang | H01R 13/502 |
| 10,490,960 | B1 * | 11/2019 | Wu | H01R 4/242 |
| 10,658,796 | B2 | 5/2020 | Liittermann | |
| 11,329,423 | B2 * | 5/2022 | Chamura | H01R 13/5837 |
| 2008/0096417 | A1 * | 4/2008 | Boeck | H01R 13/5804 439/445 |
| 2011/0136371 | A1 * | 6/2011 | Wang | H01R 13/506 439/367 |
| 2016/0268723 | A1 * | 9/2016 | Berengut | H01R 13/6392 |
| 2017/0155201 | A1 * | 6/2017 | Dold | H01R 9/223 |
| 2019/0252815 | A1 * | 8/2019 | Hara | H01R 13/4362 |
| 2020/0378534 | A1 * | 12/2020 | Smith | H02G 3/0683 |

FOREIGN PATENT DOCUMENTS

| | | | |
|---|---|---|---|
| CN | 203850519 | U | 9/2014 |
| DE | 102016116937 | A1 | 3/2018 |
| TW | M-536801 | U | 2/2017 |

* cited by examiner

ELECTRICAL CONNECTOR WITH ADJUSTABLE WIRE INLET HOLE

BACKGROUND OF THE INVENTION

1. Field of the Invention

This application claims priority of TW Patent Application No. 109137968 filed on Oct. 30, 2020, the entirety of which is incorporated by reference herein.

The invention relates to an electrical connector, particularly to an electrical connector with an adjustment mechanism on the housing.

2. Description of the Prior Art

Electronic devices often use electrical connectors to quickly connect or remove wires. Electronic devices, such as computer hosts, are connected to electrical connectors with different functions such as universal serial bus (USB) or network connector (RJ45). With the evolution of technology and the orientation of consumer demand, the size of electronic devices has become smaller and smaller, and the size of electrical connectors must correspond to electronic devices and becomes more and more compact to avoid mechanical interference when multiple electrical connectors are installed. However, the size of the electrical connector is also limited by the diameter of the electrical signal line to which it is connected. When the electrical connector is connected to the electrical signal line with a larger diameter or more core wires inside, the volume of the electrical connector also needs to be increased relatively.

In addition, when there is a large amount of plugging and unplugging demand, the junction between the electrical connector and the electrical signal line connected to the electrical connector is often damaged or broken due to external forces. In some cases, when the diameter of the electrical signal line is increased, the probability of damage will also be increased. In this regard, how to reduce the size of the electrical connector in a limited space and protect the electrical signal line has become one of the major issues in the design of the electrical connector.

SUMMARY OF THE INVENTION

One object of the invention is to provide an electrical connector with an adjustable cover to adjust a wire inlet hole of an electrical connector.

In an embodiment, the invention provides an electrical connector including a main body, a first cover, and a second cover. The main body includes a first connection portion and a wire inlet portion. An accommodating space is defined between the wire inlet portion and the first connection portion. The first cover is pivotally connected to the first connection portion to be rotatable relative to the main body between a first position and a second position. When the first cover is at the first position, the accommodating space is opened for installation of a wire. When the first cover is at the second position, the first cover at least partially closes the accommodating space for protection of the wire. The second cover is disposed at an outside of the first cover and separably covered on the wire inlet portion. The second cover and the wire inlet portion enclose a wire inlet hole therebetween. The second cover is movable relative to the wire inlet portion to adjust the size of the wire inlet hole.

In another embodiment, the invention provides an electrical connector including a main body and a cover. The main body includes a wire inlet portion and an accommodating space. The cover is separably covered on the wire inlet portion, and the cover and the wire inlet portion enclose a wire inlet hole therebetween. The accommodating space and the wire inlet hole are communicated with each other. The cover is movable relative to the wire inlet portion to adjust the size of the wire inlet hole.

As described above, the size of the wire inlet hole can be adjusted through the adjustable engagement between the cover and the main body to accommodate the size and shape of the electrical signal wire(s), so as to achieve the protection of the electrical wire(s). Furthermore, since the size of the wire inlet hole can be adjusted according to the diameter of the electrical signal wire, the electrical connector can have the most suitable size to avoid the waste of the space.

DETAILED DESCRIPTION OF THE PREFERRED EMBODIMENT

The following will clearly illustrate the spirit of the disclosure with drawings and detailed descriptions. Any person having ordinary skill in the art who understands the embodiments of the disclosure can change and modify them from the techniques taught in the disclosure without departing from the spirit and scope of the disclosure.

The terms "first", "second", etc. may be used in the disclosure, but these terms do not specifically refer to order or sequence and not used to limit the invention. Such terms are merely used to differentiate an element or an operation from another element or operation.

As used herein, "comprising", "including", "having", "containing", etc., is an open term, which means including but not limited thereto.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Figure 1A:
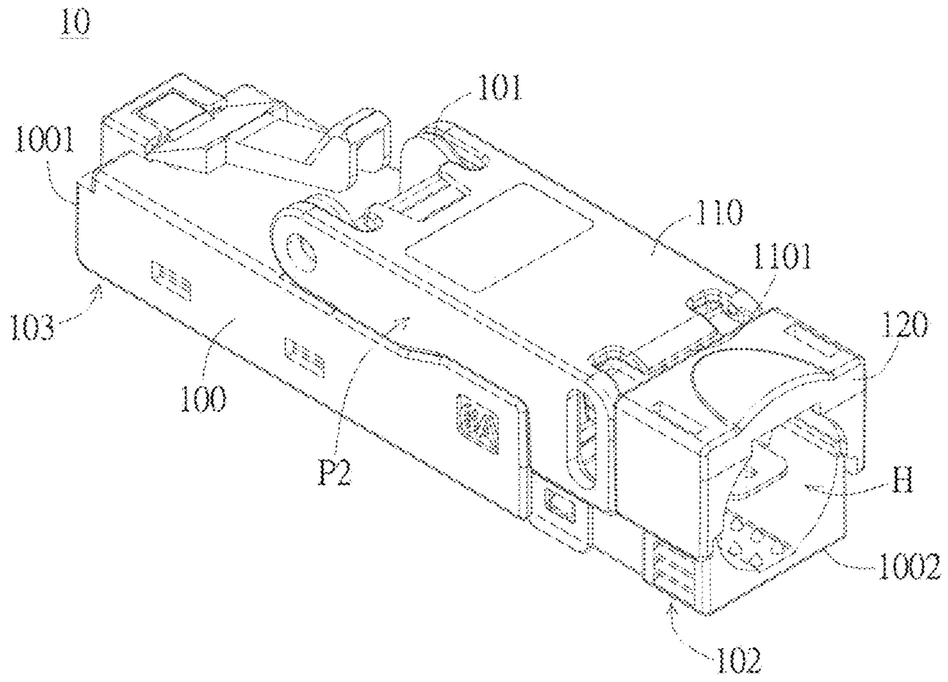
FIG. 1A and FIG. 1B are schematic views of the electrical connector of an embodiment of the invention at different viewing angles.
Figure 1B:
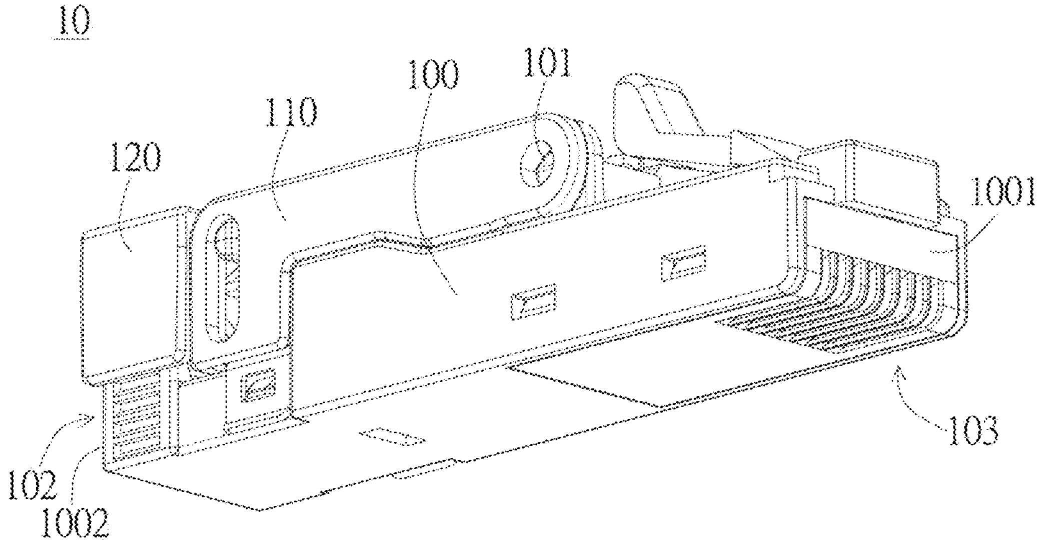

FIG. 1A and FIG. 1B are schematic views of the electrical connector 10 of an embodiment of the invention at different viewing angles. As shown in FIG. 1A, the electrical connector 10 includes a main body 100, a first cover 110, and a second cover 120. The main body 100 includes a first connection portion 101 and a wire inlet portion 102. The material of the main body 100 may be plastic or metal. The main body 100 has a first end 1001 and a second end 1002 opposite to each other. The first connection portion 101 is close to the first end 1001, and the wire inlet portion 102 is close to the second end 1002. In an embodiment, the first connection portion 101 can have a structure of a rotating shaft, and the position of the first connection portion 101 on the main body 100 is preferably between a setup portion 103 (described later) and the wire inlet portion 102. The wire inlet portion 102 is defined as at least the area where the second cover 120 is connected to the main body 100, which is close to the second end 1002 of the main body 100.

The material of the first cover 110 and the second cover 120 may be plastic or metal, but not limited thereto. The first cover 110 is pivotally connected to the first connection portion 101, so that the first cover is rotatable relative to the main body 10. The second cover 120 is disposed at an outside of a first end 1101 of the first cover 110 opposite to the first connection portion 101. The second cover 120 can be separably covered on the wire inlet portion 102, so that a wire inlet hole H is enclosed between the second cover 120 and the wire inlet portion 102.

In addition, please refer to FIG. 1B. In a preferred embodiment, the main body 100 may include the setup portion 103 at the first end 1001. The setup portion 103 is configured to provide connection with a corresponding connector socket. Preferably, the setup portion 103 is suitable for connection with a connector socket of any specification. For example, for a RJ45 socket, the setup portion 103 preferably has a specification complying with the RJ45 connector specification, but not limited thereto.

Figure 2A:
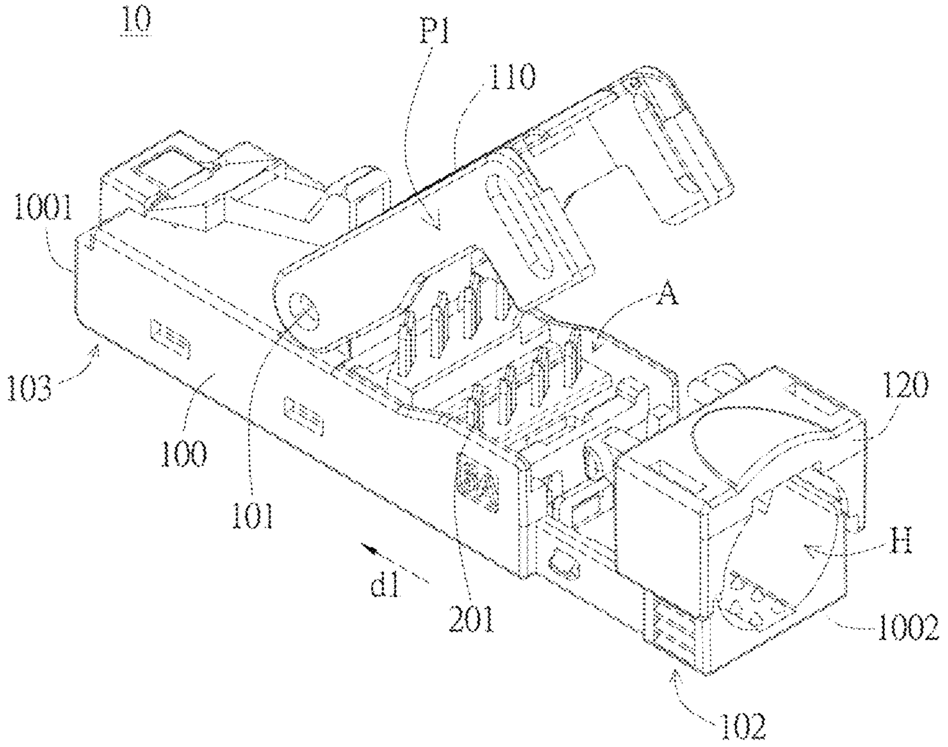
FIG. 2A and FIG. 2B are schematic views of the electrical connector of an embodiment of the invention at different viewing angles, wherein the first cover is opened.

Please refer to FIG. 2A. The main body 100 is usually a housing. For example, an accommodating space A is defined between the wire inlet portion 102 and the first connection portion 101. One or more terminals 201 can be arranged in the accommodating space A. The terminals 201 are configured to electrically connect to the conductor of the electrical signal line(s), and the terminals 201 can extend to the setup portion 103. When the setup portion 103 of the electrical connector 10 is coupled to the connector socket, the terminals 201 extending to the setup portion 103 can be electrically connected to the corresponding internal terminals of the connector socket.

The accommodating space A communicates with the wire inlet hole H. The first cover 110 is pivotally connected to the first connection portion 101 so as to be rotatably relative to the main body 100 between a first position P1 (as shown in FIG. 2A) and a second position P2 (as shown in FIG. 1A). The first cover 110 rotates with the first connection portion 101 as the rotation axis. It should be noted that the rotation range of the first cover 110 relative to the main body 100 is not limited to the embodiment. Preferably, the angle range of rotation between the first position P1 and the second position P2 can be between 0 and 180 degrees.

When the first cover 110 is located at the first position P1, the accommodating space A is opened for installation of the signal lines, such as wires or cables. Specifically, when the accommodating space A is opened, any suitable wires or cables can be inserted into the accommodating space A along the first direction d1 from the second end 1002 through the wire inlet hole H. When the first cover 110 is located at the second position P2, the first cover 110 at least partially closes the accommodating space A for protection of the signal lines, which are inserted into the accommodation space A.

Figure 2B:
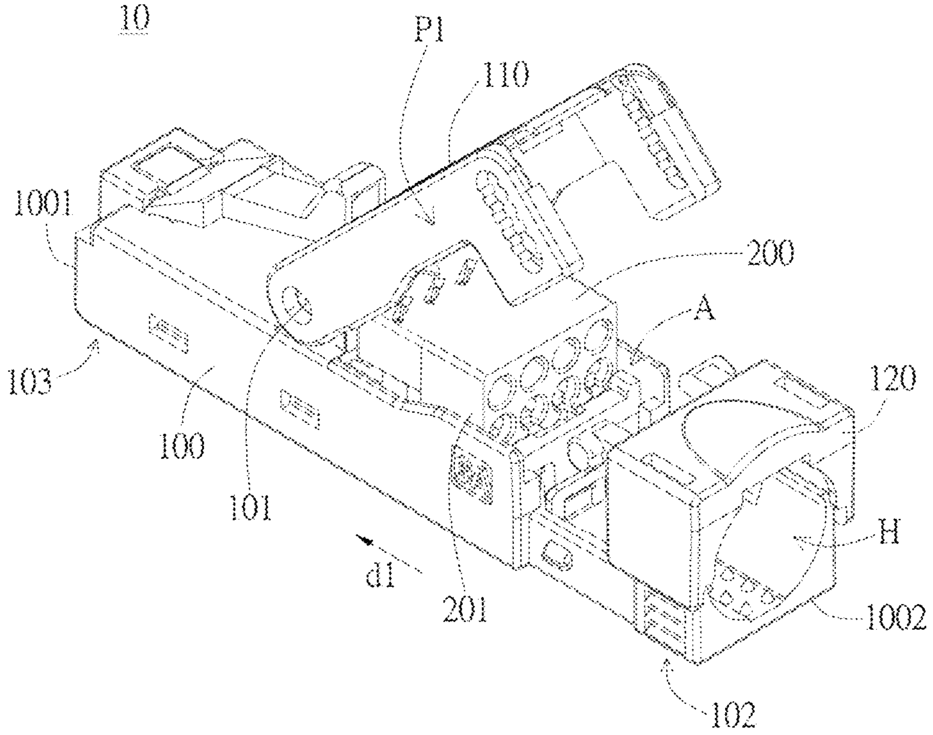

In another embodiment, referring to FIG. 2B, a wire management box 200 can be provided in the accommodating space A. One end of the electrical signal line can extend into the wire management box 200. When the conductor of the electrical signal line is electrically connected to the terminal 201, the wire management box 200 can stably hold the electrical signal line, but not limited thereto.

Figure 3A:
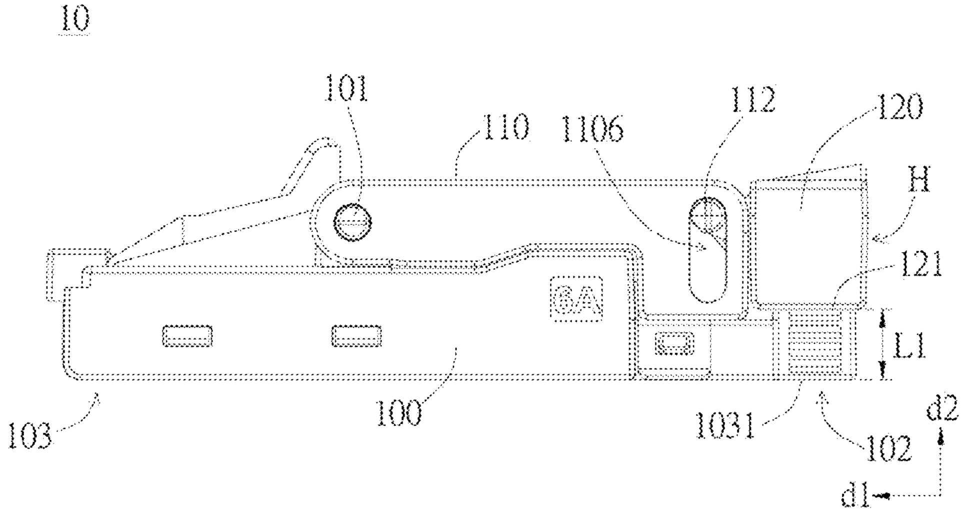
FIG. 3A and FIG. 3B are schematic views showing the adjustment of the wire inlet hole of the electrical connector through the second cover according to an embodiment of the invention.
Figure 3B:
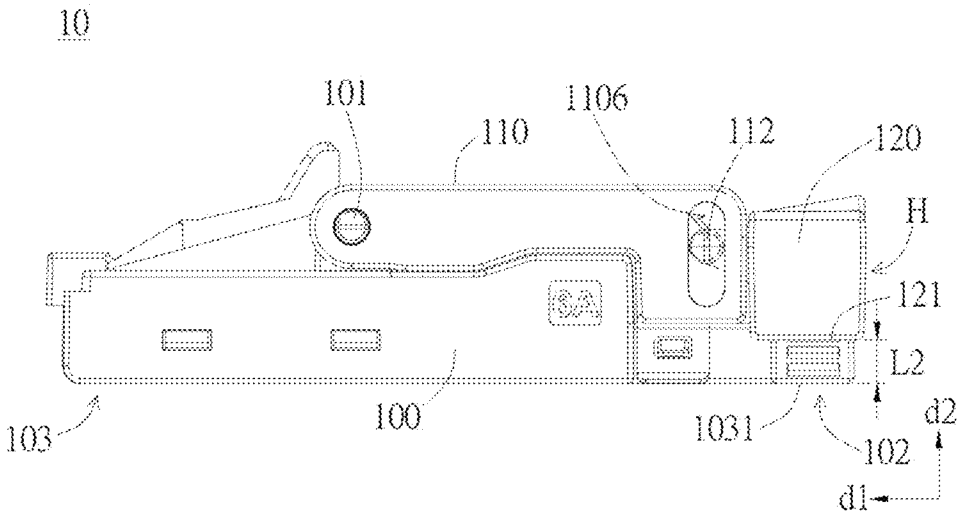

Please refer to FIG. 3A and FIG. 3B. The second cover 120 can be movable relative to the wire inlet portion 102 to adjust the size of the wire inlet hole H. For example, the second cover 120 can be movable relative to the wire inlet portion 102 along the second direction d2, so that the distance between the bottom 121 of the second cover 120 and the bottom 1031 of the wire inlet portion 102 is changed from a first distance L1 to a second distance L2. In this embodiment, the first distance L1 is greater than the second distance L2. In other words, the wire inlet hole H is increased as the above distance is changed from the first distance L1 to the second distance L2, but not limited thereto.

In another embodiment, the second cover 120 can move along the second direction d2 in a manner that the above distance is changed from the second distance L2 to the first distance L1, so that the size of the wire inlet hole H is decreased. The size of the wire inlet hole H can be adjusted by the relative distance between the second cover 120 and the wire inlet portion 102.

Figure 4A:
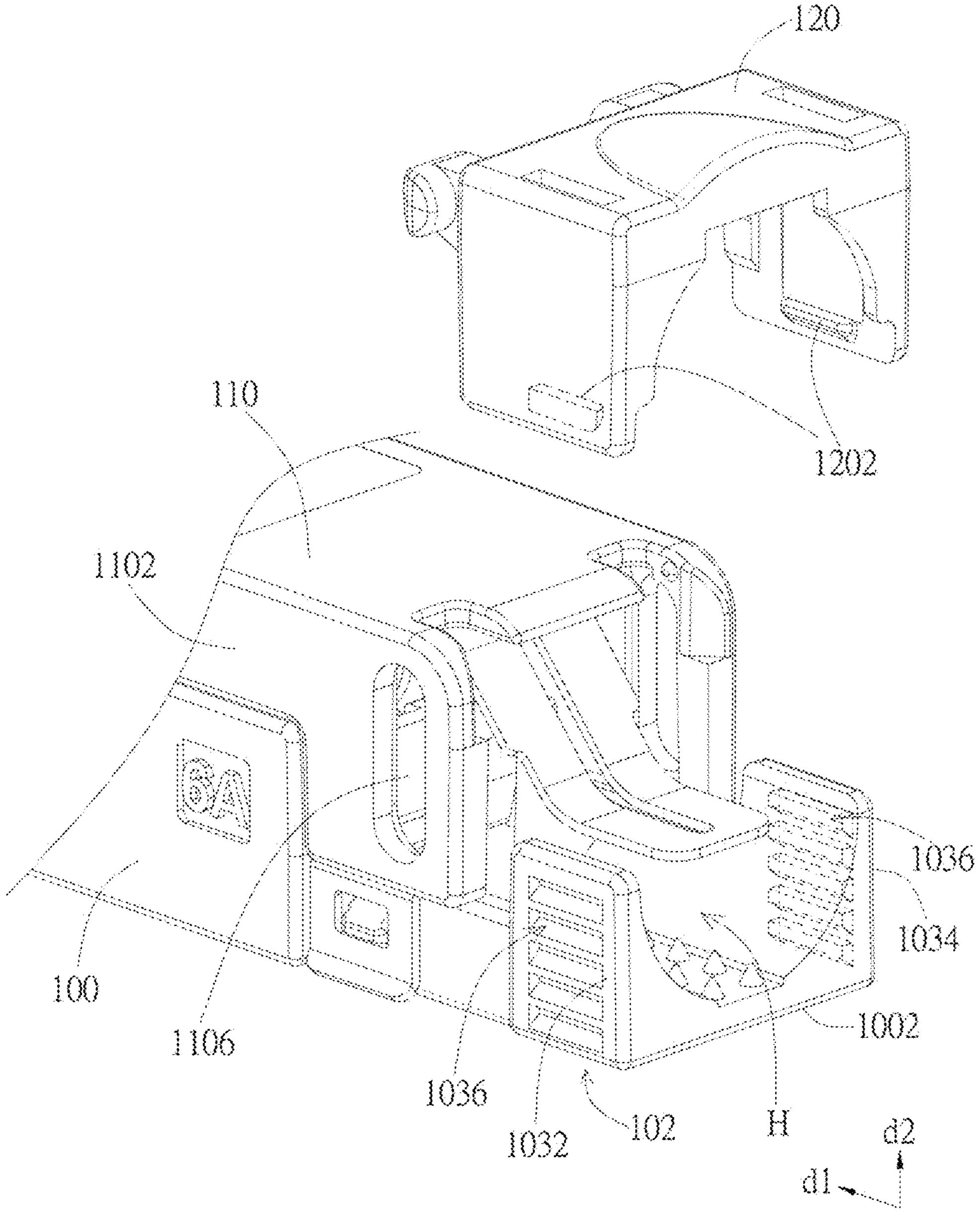
FIG. 4A and FIG. 4B are a schematic view of a coupling portion of the second cover and an adjusting portion of the wire inlet portion according to an embodiment of the invention.

In an embodiment, referring to FIG. 4A, the first cover 110 has a first side wall 1102 and a second side wall 1104 near the first end 1101. At least one of the first side wall 1102 and the second side wall 1104 has a groove 1106, and the second cover 120 has a second connection portion 112 corresponding to the groove 1106.

Figure 4B:
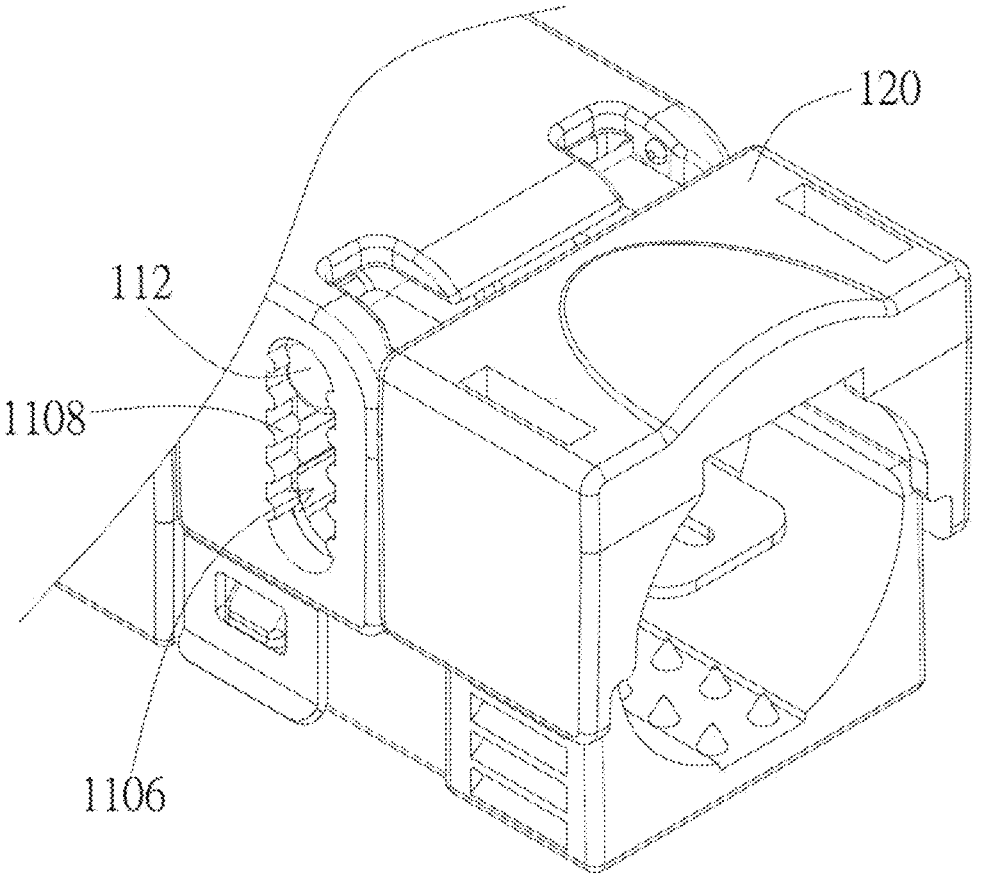

In an embodiment, the groove 1106 can be a through hole penetrating the side wall 1102 or side wall 1104. In another embodiment, the groove 1106 can be a blind hole or a recess on the inner surface of the side wall 1102 or side wall 1104. For example, the groove 1106 is configured to limit the position of the second cover 120 or prevent the second cover 120 from falling off the first cover 110, but not limited thereto. The groove 1106 preferably extends along the second direction d2 to have an elongated shape. Referring to FIG. 4B, in another embodiment, the groove 1106 can be provided with a limiting structure 1108 so that the second connection portion 112 can be adjustably positioned in the groove 1106, thereby stably support the second cover 120.

For example, the limiting structure 1108 in FIG. 4B may include protrusion-like structures. When the second cover 120 moves relative to the wire inlet portion 102, the second connection portion 112 can correspondingly move in the groove 1106 and stably positioned at a corresponding position by the limiting structure 1108. In other words, when adjusting the size of the wire inlet hole H, the position of the second connection portion 112 in the groove 1106 can be positioned by interfering with the corresponding protrusion of the limiting structure 1108.

In an embodiment, the wire inlet portion 102 has a first surface 1032 and a second surface 1034 opposite to each other. At least one of the first surface 1032 and the second surface 1034 has an adjusting portion 1036, and the second cover 120 has a coupling portion 1202 corresponding to the adjusting portion 1036. The coupling portion 1202 is separably engaged with the adjusting portion 1036. For example, the adjusting portion 1036 and the coupling portion 1202 can be a combination of a groove and a buckle. When the adjusting portion 1036 is a groove, the coupling portion 1202 can be a corresponding buckle.

Alternatively, when the adjusting portion 1036 is a buckle, the coupling portion 1202 can be a corresponding groove. The groove can extend along the first direction d1, and a plurality of grooves are arranged along the second direction d2. When the second cover 120 moves relative to the wire inlet portion 102, the coupling portion 1202 is selectively engaged with a corresponding one of the grooves of the adjusting portion 1036. The coupling manner of the adjusting portion 1036 and the coupling portion 1202 is not limited to the embodiment.

Figure 5A:
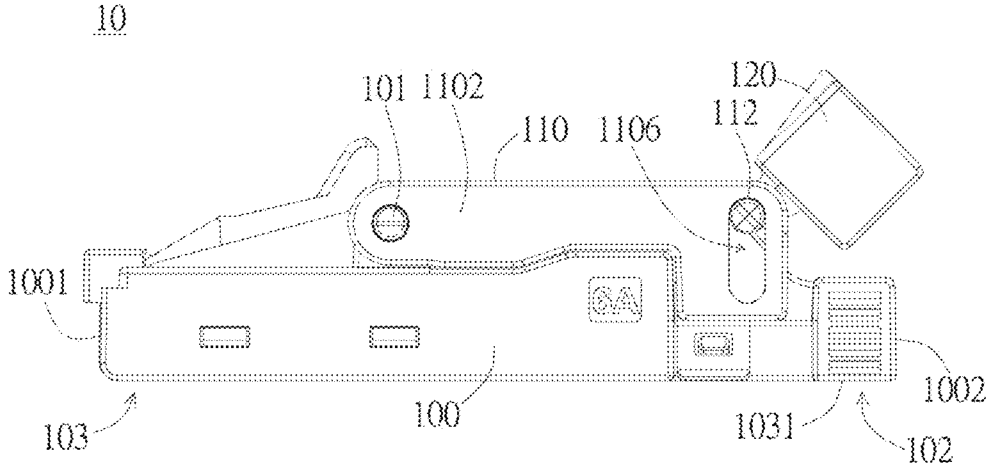
FIGS. 5A to 5C are schematic views of the pivotal connection between the second cover and the first cover according to an embodiment of the invention.
Figure 5B:
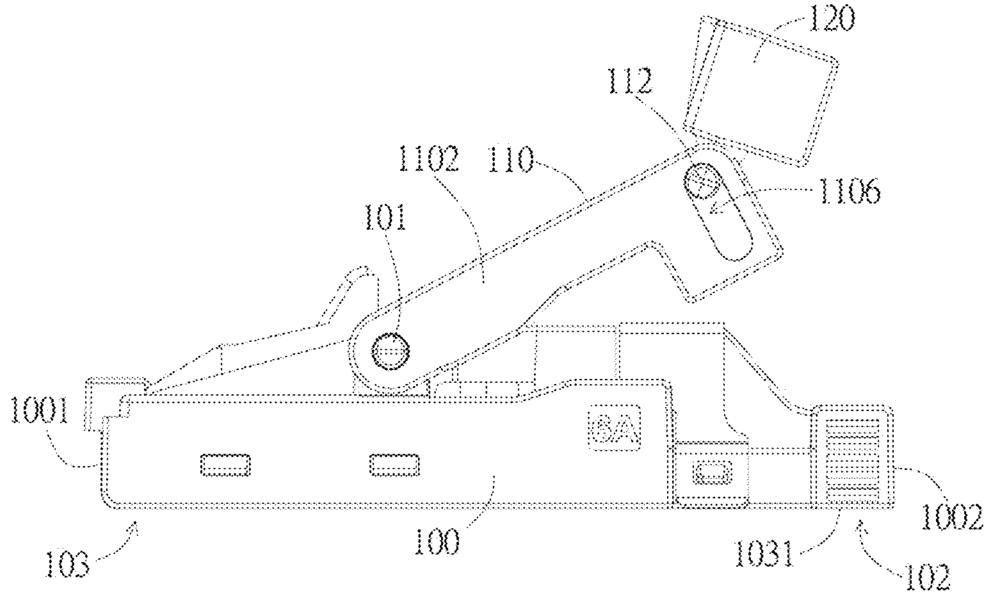

In an embodiment, referring to FIG. 5A and FIG. 5B, the second connection portion 112 of the second cover 120 is pivotally connected to the first end 1101 of the first cover 110 of the electrical connector 10, so that the second cover 120 can be rotatable relative to the first cover 110. For example, the second connection portion 112 can be a rotating shaft or a protrusion received in the groove 1106, so that the second cover 120 can rotate relative to the first cover 110 with the second connection portion 112 as the rotation axis.

Figure 5C:
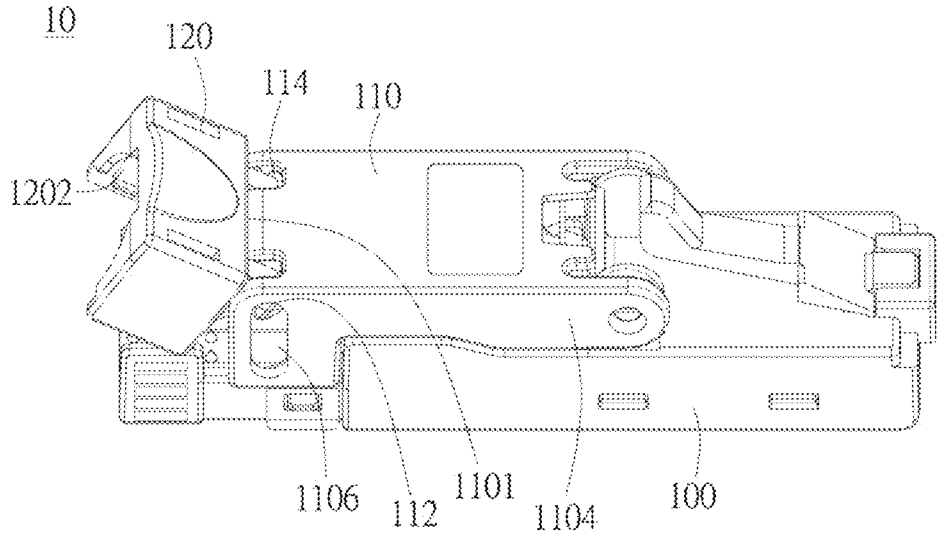

In an embodiment, as shown in FIG. 5C, the first cover 110 has at least one slot 114 at the first end 1101. The slot 114 is configured to allow the second cover 120 to partially rotate thereinto. For example, the slot 114 extends from the edge of the first end 1101 along the rotation direction of the second cover 120, so that the rotation angle of the second cover 120 relative to the first cover 110 can be increased, and the interference during rotation can be reduced, but not limited thereto.

Figure 6A:
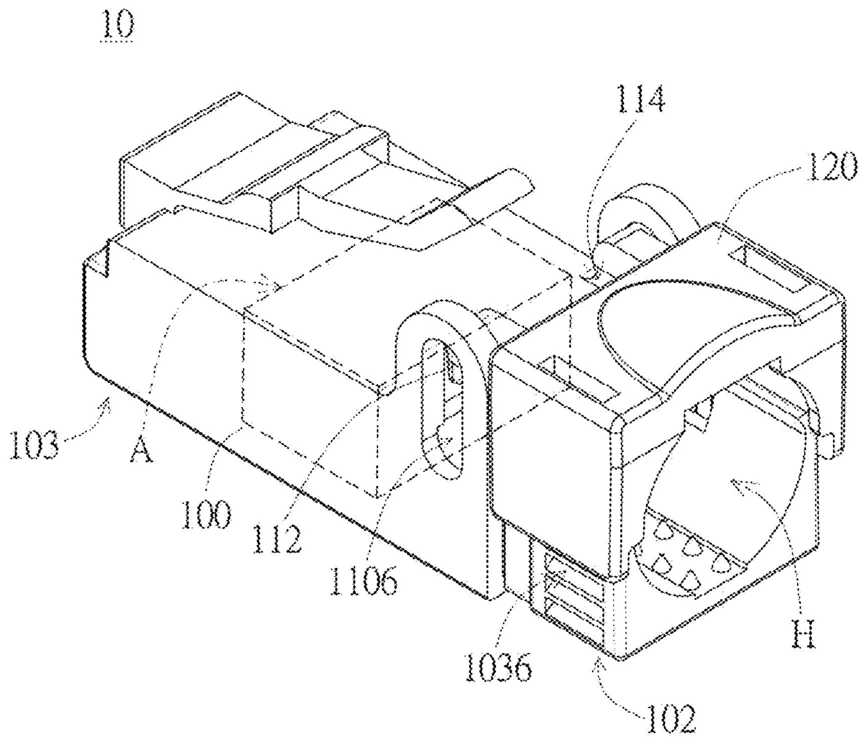
FIG. 6A and FIG. 6B are schematic views of the electrical connector according to different embodiments of the invention.
Figure 6B:
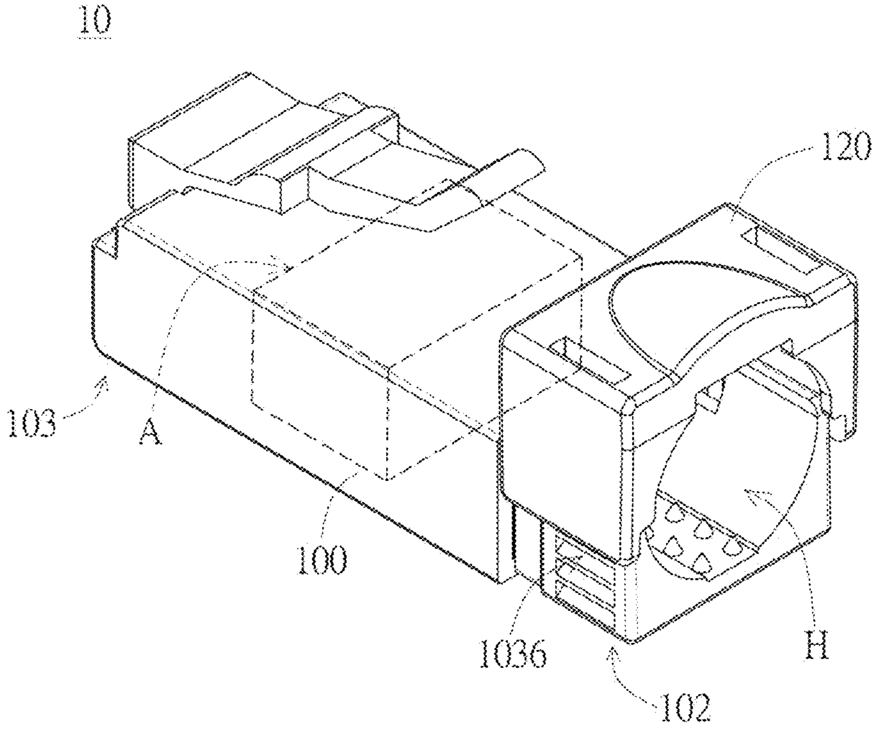

The electrical connector of the invention is not limited to the use of the first cover 110. Any method for adjusting the wire inlet hole H at the wire inlet portion 102 is within the spirit of the invention. As shown in FIG. 6A and FIG. 6B, in another embodiment, the electrical connector 10 includes a main body 100 and a cover, such as the second cover 120.

The main body 100 includes a wire inlet portion 102 and an accommodating space A(as shown in FIG. 6A and FIG. 6B). The second cover 120 is separably covered on the wire inlet portion 102, and a wire inlet hole H is enclosed between the second cover 120 and the wire inlet portion 102. The accommodating space A and the wire inlet hole are communicated with each other. The second cover 120 can be movable relative to the wire inlet portion 102 to adjust the size of the wire inlet hole H.

In this embodiment, as shown in FIG. 6A, the second cover 120 is movably (i.e., pivotally) connected to the main body 100 by means of the second connection portion 112 and the groove 1106 of the main body 100, but not limited thereto. As shown in FIG. 6B, in another embodiment, the main body 100 may not be disposed with the groove 1106, and the second cover 120 is movably connected to the main body 100 by means of the coupling portion 1202 and the adjusting portion 1036. As such, the second cover 120 is movable relative to the wire inlet portion 102 of the main body 100 to adjust the size of the wire inlet hole H.

In addition, the main body 100 can include a setup portion 103, which is preferably suitable for connection with a connector socket of any specification. For example, for a RJ45 socket, the setup portion 103 preferably has a specification complying with the RJ45 connector specification, but not limited thereto. It should be noted that the setup portion 103 is arranged according to the depth of the corresponding socket.

It is noted that the main body 110 may have at least one slot 114, which is configured to allow the second cover 120 to partially rotate thereinto as described above, and other details of the main body 110 and the second cover 120 can refer to the related descriptions of the previous embodiment and will not elaborate again.

Although the preferred embodiments of the invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. An electrical connector, comprising:

a main body, comprising:

a first connection portion; and a wire inlet portion, wherein an accommodating space is defined between the wire inlet portion and the first connection portion;

a first cover pivotally connected to the first connection portion to be rotatable relative to the main body between a first position and a second position, wherein when the first cover is at the first position, the accommodating space is opened for installation of a signal line, and wherein when the first cover is at the second position, the first cover at least partially closes the accommodating space for protection of the signal line, the first cover has a first side wall and a second side wall at a first end, at least one of the first side wall and the second side wall has a groove; and a second cover connected to the first cover and separably covered on the wire inlet portion, wherein the second cover and the wire inlet portion enclose a wire inlet hole therebetween, and the second cover has a second connection portion, wherein the second portion is movably received in the groove, so that the second cover is movable relative to the wire inlet portion to adjust a size of the wire inlet hole.

2. The electrical connector of claim 1, wherein the second connection portion pivotally connected to the first cover, so that the second cover is rotatably relative to the first cover.

3. The electrical connector of claim 2, wherein the first cover has at least one slot at a first end, and the slot allows the second cover to partially rotate thereinto.

4. The electrical connector of claim 1, wherein the wire inlet portion has a first surface and a second surface opposite to each other, and at least one of the first surface and the second surface has an adjusting portion, wherein the second cover has a coupling portion corresponding to the adjusting portion, and the coupling portion is separably engaged with the adjusting portion.

5. An electrical connector, comprising:

a main body, comprising:

a first connection portion; and a wire inlet portion, wherein an accommodating space is defined between the wire inlet portion and the first connection portion;

a first cover pivotally connected to the first connection portion to be rotatable relative to the main body between a first position and a second position, wherein when the first cover is at the first position, the accommodating space is opened for installation of a signal line, and wherein when the first cover is at the second position, the first cover at least partially closes the accommodating space for protection of the signal line; and a second cover connected to the first cover and separably covered on the wire inlet portion, wherein the second cover and the wire inlet portion enclose a wire inlet hole therebetween, and the second cover is movable relative to the wire inlet portion to adjust a size of the wire inlet hole, wherein the first cover has a first side wall and a second side wall at a first end, and at least one of the first side wall and the second side wall has a groove;

wherein the groove has a limiting structure, so that the second connection portion is adjustably disposed in the groove.

* * * * *